United States Patent [19]
Voigt et al.

[11] Patent Number: 5,566,087
[45] Date of Patent: Oct. 15, 1996

[54] GIMBAL CONTROL SYSTEM USING A TRACKBALL

[75] Inventors: Allan A. Voigt; John M. Speicher; Che-Ram S. Voigt, all of Geyserville, Calif.

[73] Assignee: Versatron Corporation, Healdsburg, Calif.

[21] Appl. No.: 358,940

[22] Filed: Dec. 19, 1994

[51] Int. Cl.⁶ .............................. G09G 5/08; G06F 17/50
[52] U.S. Cl. ........................ 364/505; 345/163; 345/166; 345/167
[58] Field of Search ..................... 364/454, 453, 364/505; 345/167, 156, 157, 158, 159

[56] References Cited

U.S. PATENT DOCUMENTS

| | | | |
|---|---|---|---|
| Re. 34,931 | 5/1995 | Duchon | 250/221 |
| 4,286,289 | 8/1981 | Ottesen et al. | 358/125 |
| 5,280,276 | 1/1994 | Kwok | 345/167 |
| 5,355,148 | 10/1994 | Anderson | 345/166 |
| 5,428,368 | 6/1995 | Grant | 345/163 |
| 5,438,404 | 8/1995 | Hamilton et al. | 356/152.2 |

*Primary Examiner*—James P. Trammell
*Assistant Examiner*—Demetra R. Smith
*Attorney, Agent, or Firm*—Henry M. Bissell

[57] ABSTRACT

A gimbal control system including a hand controller having a trackball and a mode select switch for determining the mode of gimbal control. The mode control switch is capable of selecting between four different control modes. The trackball is enabled to control movement of the gimbal in different control relationships depending on the control mode which is selected. The hand controller includes a plurality of other switches for enabling the trackball to provide additional system control capabilities. The hand controller is ergonomically designed to minimize operator stress and fatigue during extended missions. It has a particular shape and the various control elements are strategically positioned to provide ready access to an operator's manual digits when the controller is held in the right hand with both hands and arms in a naturally relaxed attitude oriented at approximately a right angle.

26 Claims, 3 Drawing Sheets

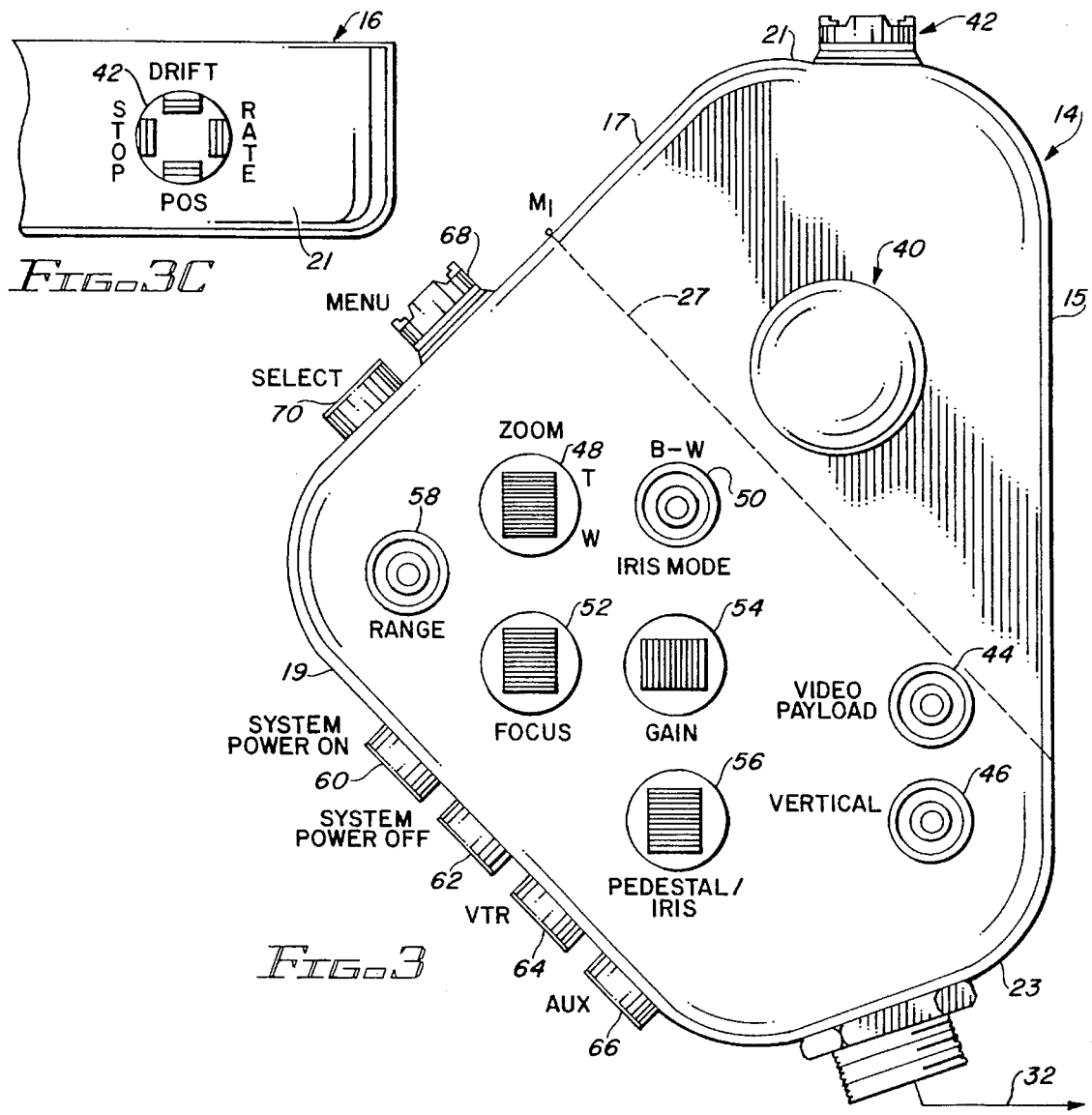
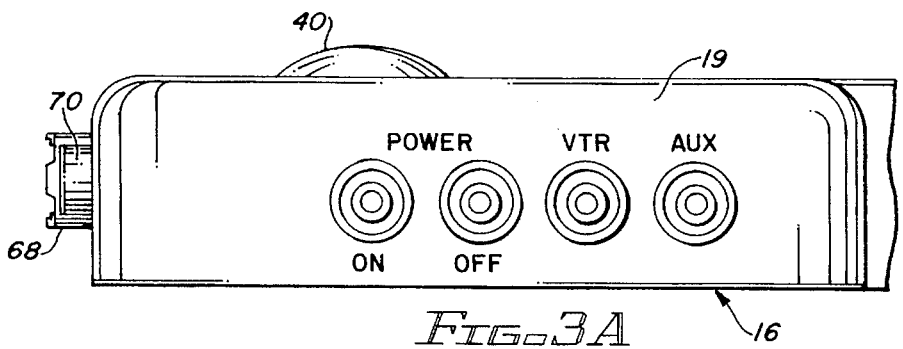

GIMBAL CONTROL SYSTEM USING A TRACKBALL

BACKGROUND OF THE INVENTION

1. Field of the Invention

This invention relates to apparatus for controlling gimbal-stabilized platforms and the like and, more particularly, to such apparatus incorporating a trackball as a user-input device.

2. Description of Related Art

Gimbal stabilization of support platforms for cameras and the like is commonly used where the camera in operation is being transported by a vehicle, such as aircraft, boats or ground vehicles, and stabilization is needed to obtain clear images. Examples of such applications include remotely piloted aircraft (drones) where a video camera is used to provide signals over a video link to an observer in another aircraft or on the ground, infrared sensors mounted on helicopters for providing images to the pilot for enhanced night vision operations, movie cameras at motion picture production sites, boom-mounted cameras at sporting events and the like for following a football or golf ball in flight, and numerous similar applications. In the past, gimbal control has commonly been effected through the use of spring-loaded "joy sticks". A typical joy stick comprises a short, generally vertically oriented stick having a tip which may be manipulated by the thumb and fingers of an operator in two orthogonal directions to provide "x" and "y" input to the system. Joy sticks are commonly used as a control mechanism in video and computer games.

In computer jargon, a trackball may be commonly used as a substitute for a mouse, which is a cursor control mechanism. In the present invention, a trackball is combined with a mode selection switch to replace spring-loaded joy stick control methods of gimbal control which are known in the prior art.

SUMMARY OF THE INVENTION

In brief, arrangements in accordance with the present invention comprise a pair of input devices—a trackball and a two, three, or four-position momentary mode select switch (which may be a plurality of switches)—used in tandem to provide the control input to an associated system control computer which interprets the signals from the two input devices and uses system software programs to command movement of an associated gimbal. The mode select switch permits selection from two modes which can be used for rate tracking: the "stick" mode and the "drift" mode. Typically, the system "wakes up" in the "stick" mode. The trackball and the mode select switch are located such that they can be operated with the thumb and fingers of one hand without changing the position of the hand itself on the control module.

"Stick" Mode (Also Known as "Rate" Mode)

In the "stick" mode, so-called because trackball control replaces conventional joystick control, displacement of the trackball from the initial or "zero" position is equal to the commanded gimbal rate. This mode is a configurable gain rate loop control mode. Oftentimes, the "stick" mode is arranged such that the command error increases non-linearly with displacement.

Normally, the operator finds and tracks a target in the "stick" mode. When tracking is going well and the operator wants to work with less sensitivity, he "clicks" in the "stick" mode again. This re-zeroes the track sensitivity to the presently required conditions. In the case where the rate is commanded linearly with displacement, then it is not required to return to a low gain central region.

"Drift" Mode

For even finer control, or for "drift" biasing the system, the operator "clicks" into drift mode. The "drift" mode is a low gain rate loop control mode. The trackball now becomes a simple linear X-Y bias input. The bias offsets are used by the system to adjust system rate drifts to the rates desired. During the drift mode operation, any time the operator desires he can re-enter the "stick" mode by "clicking" the mode select switch back to "stick" mode. This re-establishes a new "zero" (if a non-linear gain profile is used) and allows high slew rate gimbal operation.

The trackball is mounted in a hand held control panel which also contains the mode selection switch and other controls for the display monitor and other system control switches. The control panel has a generally triangular shape in which two of the vertices of the triangle are truncated and each point of intersection of two planar surfaces about the periphery of the control panel is rounded instead of having a definite vertex. Thus the peripheral shape may be considered to comprise three major sides and two minor sides where the truncations occur with the respective intersections of all adjacent sides being gently rounded. This shape is ergonomically designed to reduce stress in the operator's hands and arms by permitting the hands and arms to lie naturally on the controls. The unit is designed to be held with the right hand curved around the right edge so that the thumb and forefinger naturally access the trackball and the mode selection switch, respectively. When a person's arms are positioned naturally with the hands joined or touching, as lying on one's lap, the arms naturally come together at an approximately 90 degree angle. In this attitude, with the control panel held in the right hand as described, with the palm and remaining fingers curving around the right side of the control pane, the position of the left hand is naturally such that the thumb and fingers of the left hand have ready access to the remaining switches and other controls which are mounted on the control panel.

In accordance with one aspect of the invention, additional features can be added to allow position mode control and to allow control of the gimbal to be regained if the operator has input slew rates which are too high. These features may be incorporated in an additional two-position mode selection switch or, in the preferred embodiment depicted in the drawings, a momentary actuate, four-position, center-off switch which has added positions for the two additional modes: "position" and "stop" plus the "stick" and "drift" mode positions already discussed. The "position" and "stop" modes function as follows:

"Position" Mode

In the "position" mode, the gimbal is operated in position feedback mode without rate stabilization. The system can be commanded to return to "boresight" or some other predetermined position as soon as the "position" mode is selected. The gimbal can then be commanded from this position by motion of the trackball. This "position" mode can be selected from the mode select switch.

"Stop" Mode

The "stop" mode allows the operator to escape from a set of gimbal motions which are not desired. The "stop" mode returns the gimbal to space stabilized control with the previously established gyro drift rate bias. This allows the operator to reorient himself. The gimbal is not commanded in the "stop" mode. To again control the gimbal, the operator needs; to select "stick", "drift" or "position" mode The gimbal control software is configured to cause the gimbal to respond in a multiplicity of ways, depending upon the sequence of commands from the mode select switch. For example, selecting "position" followed by "stop" serves to command the gimbal to "boresight" (align with the longitudinal axis of the aircraft).

BRIEF DESCRIPTION OF THE DRAWINGS

A better understanding of the present invention may be realized from a consideration of the following detailed description, taken in conjunction with the accompanying drawing in which:

FIG. 3 is a top plan view of the hand-held control panel in the system of FIG. 1;

FIG. 3A an elevational view of a first side of the control panel of FIG. 3;

FIG. 3C is an elevational view, partially broken away, of a third side of the control panel of FIG. 3;

DESCRIPTION OF THE PREFERRED EMBODIMENT

The present invention is described herein in the context of a particular gimbal control system typically mounted in a helicopter or some other terrain observation aircraft. It will be understood, however, that the invention may have utility in other applications. The scope of the invention is not to be limited, therefore, by the context in which it is disclosed herein.

Figure 1:
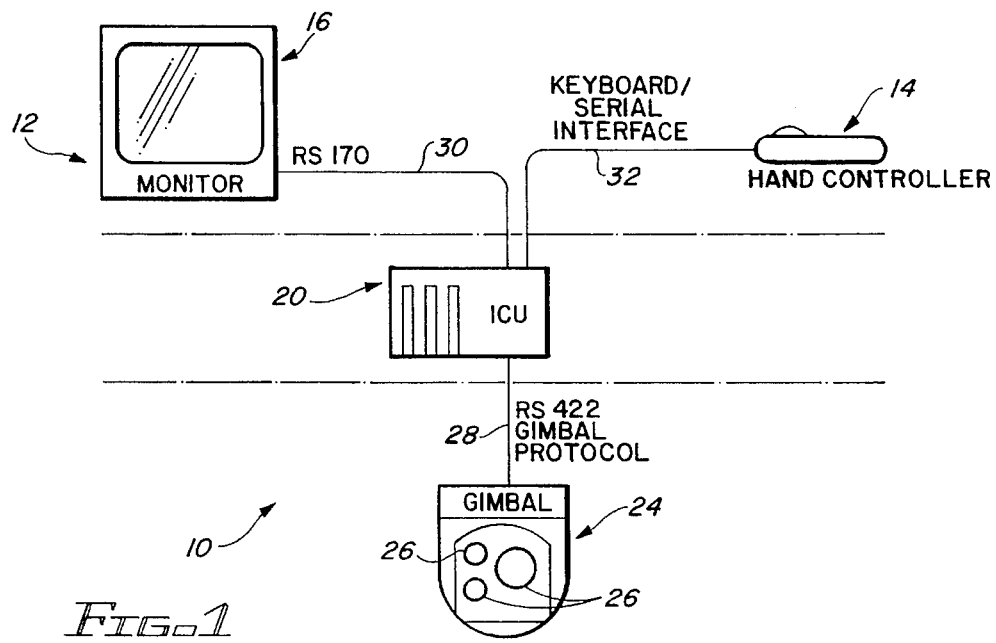
FIG. 1 is a schematic block diagram of a gimbal control system incorporating a hand-held control panel in accordance with the present invention.
Figure 2:
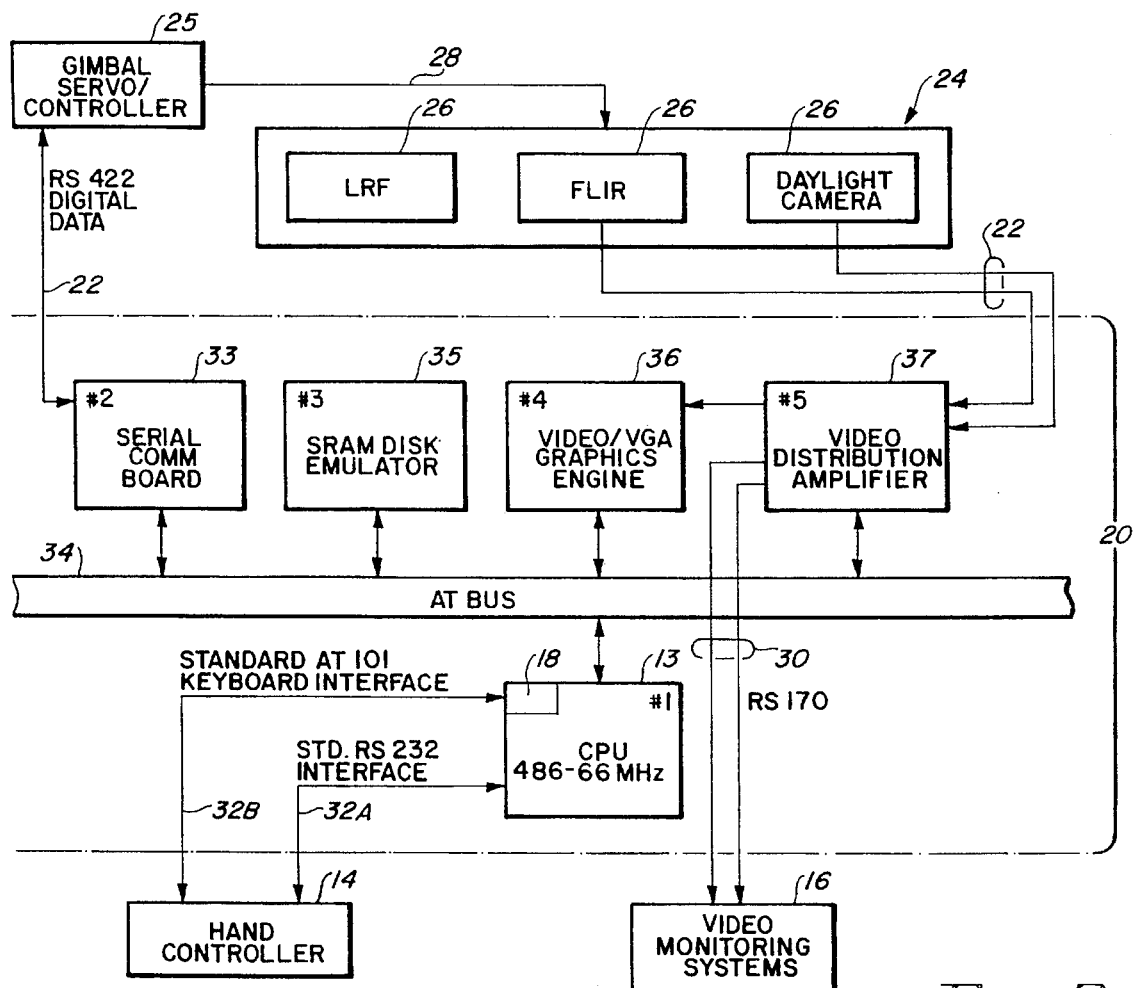
FIG. 2 is a schematic block diagram of the system of FIG. 1 showing certain interconnections in greater detail.

FIGS. 1 and 2 depict a gimbal control system 10 in which an operator section 12 comprises a hand-held control panel 14 and a monitor 16. The system 10 further comprises an interface control unit (ICU) 20 for signal processing and a gimbal unit 24 for observation and tracking. The gimbal unit 24 supports one or more sensors 26 and is electrically connected to the ICU 20 through cable 28. In this embodiment, the monitor 16 is an eight-inch color video monitor which is connected to the ICU 20 by cable 30. A cable 32 similarly connects the hand controller 14 to the ICU 20. In the system 10 as depicted in FIG. 1, the control panel 14 generates commands for the ICU 20 which, after processing, are sent on to the gimbal unit 24. The ICU 20 also processes sensor data originating from a sensor 26 in the gimbal 24 for display on the video monitor 16 which provides visual reference for the hand controller operator.

The preferred embodiment of the invention utilizes a SKYBALL® stabilized platform as the gimbal unit 24, The SKYBALL® stabilized platform is produced by Versatron Corporation of Healdsburg, Calif. for payloads encompassing forward looking infrared radar (FLIR), daylight TV with zoom lens, low light level TV with zoom lens, laser range finder or designator and combination TV and FLIR with applications for remotely piloted vehicles, fixed wing aircraft, rotary wing aircraft, ground vehicles, water-borne vehicles and the like. It has the following gimbal specifications:

Outside Diameter: 14"

Azimuth Rotation: 360 degrees Continuous

Elevation Rotation: +30 degrees to −120 degrees

Slew Rate 1.4 Radians/Sec

Acceleration 5 Radians/Sec/Sec

Jitter Less than 15 microrads RMS

In the more detailed representation of FIG. 2, the ICU 20 is shown including a microprocessor or central processing unit (CPU) 13 which is a PC 486 chip operating at 66 megahertz (MHz). The cable 32 from hand controller 14 comprises a pair of links 32A, 32B. Link 32A connects a trackball 40 in the hand controller 14 to the CPU 13 via a standard RS232 interface. The link 32B connects a plurality of switches in the hand controller 14 to a standard AT 101 keyboard interface 18 in the CPU 13. The keyboard interface 18 is of the type, known in the art, which converts input signals to discrete control signals corresponding to standard AT 101 keyboard key switches, thus enabling the various switches of the hand controller 14 to appear to the CPU 13 as a standard input device or source of control signals. The interface is thus the equivalent of a look-up table which converts a given switch function to a corresponding keyboard key press, thereby developing an appropriate command to the CPU.

The CPU 13 is coupled to an AT bus 34 having a plurality of slots for the mounting of various interface boards in conventional fashion. These include a serial communications board 33 which interfaces with a gimbal servo controller 25 via an RS422 digital data link 22, a disc emulator board 35 having a plurality of static ram (SRAM) memory chips, a video/VGA graphics engine board 36 and a video distribution/amplifier board 37. The board 37 exchanges data with the video/VGA board 36. The board 37 also receives data from the sensors 26 in the gimbal unit 24 and provides outputs to the video monitoring systems 16.

The hand-held control panel 14 is more particularly represented in FIGS. 3 and 3A–3C. In the depicted embodiment, it measures approximately 19 cm. long, 14.5 cm. wide and 5 cm. thick. The control panel 14 is generally triangular in shape with three triangle side sections 15, 17 and 19. Two of the triangle vertices are truncated by sides 21 and 23. The third triangle apex, between the sides 17 and 19, is gently rounded, as are all of the other intersections of adjacent planar side portions of the control panel 14.

Figure 3B:
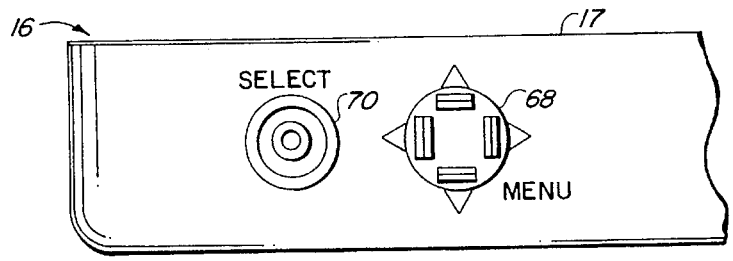
FIG. 3B is an elevational view of a second side of the control panel of FIG. 3.

In this embodiment there are a total of 16 controls located on its top surface (FIG. 3) and around three of its sides (FIGS. 3A–3C). These vary in operation from simple push button switches or two-position, center off, rocker switches to four-position, center off selection switches and an omnidirectional trackball control element. These controls are designated as follows:

| | |
|---|---|
| trackball 40 | mode select switch 42 |
| video payload switch 44 | vertical mode switch 46 |
| zoom control switch 48 | iris mode switch 50 |
| focus control switch 52 | gain control switch 54 |
| pedestal-iris switch 56 | range switch 58 |
| power on switch 60 | power off switch 62 |
| VTR switch 64 | auxiliary switch 66 |
| menu switch 68 | select switch 70 |

All of these controls are located in positions on the control panel 14 so that the panel can be easily held by the operator with the respective digits of the operator's hands having natural and easy access to the controls. The control panel 14 is designed to be held in the operator's right hand with the forefinger accessing the mode select switch 42 and the thumb controlling the trackball 40. The operator's left hand will be naturally positioned to access the left and lower portions of the control panel 14 where the remaining controls are positioned to be conveniently available along the upper face of the control panel 14, below the trackball 40, and along the sides 17 and 19.

The controls for operation by the thumb and fingers of the left hand are positioned along the side 19, the side 17 below the approximate midpoint M thereof, and on the upper face of the control panel 14 in a region bounded by the sides 17, 19 and the broken line 27 which is shown extending from the point M parallel to the side 19. The truncations 21, 23 conveniently mount the mode select switch 42 and the connection for the cable 32, respectively.

The trackball 40 is an omnidirectional control device that sends azimuth and elevation commands to the CPU 13 for processing and for ultimately controlling the gimbal 24 (FIG. 1) when one of the available modes is selected by the mode select switch 42.

The video payload switch 44 selects the operative sensor. When pressed, it switches to the next available sensor. In the current configuration, this means that it toggles between FLIR (forward looking infrared) and DLTV (daylight television).

The vertical mode switch 46, when pressed, places the system in a mode in which the movement of the trackball 40 serves to command gimbal movement in a downward direction in a ± four degree cone around vertical. This allows the sensors to view an area directly below the aircraft in which the gimbal does not function while in its rate mode. The vertical mode can only be entered from the rate mode or the drift trim mode.

The range switch 58 is a momentary push button which is only used in connection with a laser range finder, serving to connect it into the loop to the ICU 20.

The mode select switch 42 is a four-way, center off, momentary contact rocker switch. The direction in which the switch is tilted determines the mode in which the gimbal is operated and defines trackball functionality. There are four modes which may be selected: Position, Rate, Drift Trim and Stop. As viewed when the control switch is turned toward the viewer (as in FIG. 3C) selection of these modes is made by moving the switch down, right, up and left, respectively. As soon as a selection is made, the switch is allowed to return to the center off position.

When the Position mode is selected, the gimbal goes to a preset position which is determined by the menu, as described in greater detail hereinbelow. The default position is zero (i.e., "boresight": 90 degrees in elevation and 0 degrees azimuth with reference to the longitudinal axis of the aircraft). In the Position mode, the gimbal is pointed to the commanded position relative to the aircraft without gyro stabilization.

In the Position mode, the gimbal can be commanded to move in the direction of movement of the trackball 40. The rate of movement in this mode is determined by the amount of movement of the trackball with a constant linear rate of increase with trackball movement. This rate of increase can be menu selected and does not change with the sensor field of view (FOV).

Figure 4:
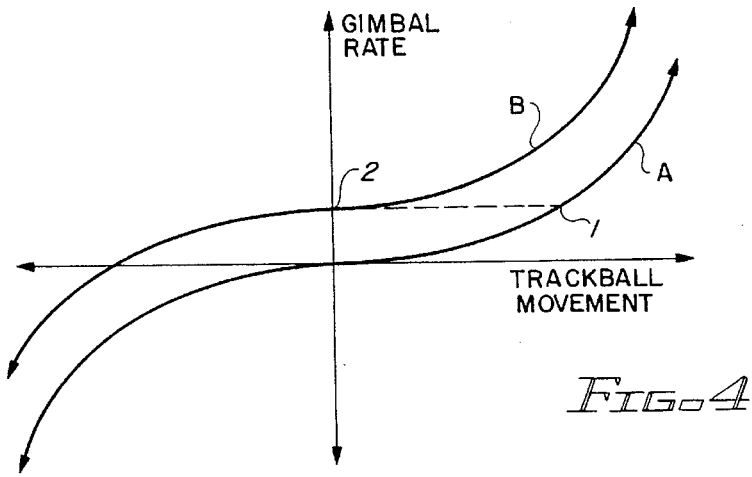
FIG. 4 is a graph showing plots of trackball movement in one particular mode of operation of the system of FIG. 1.
Figure 5:
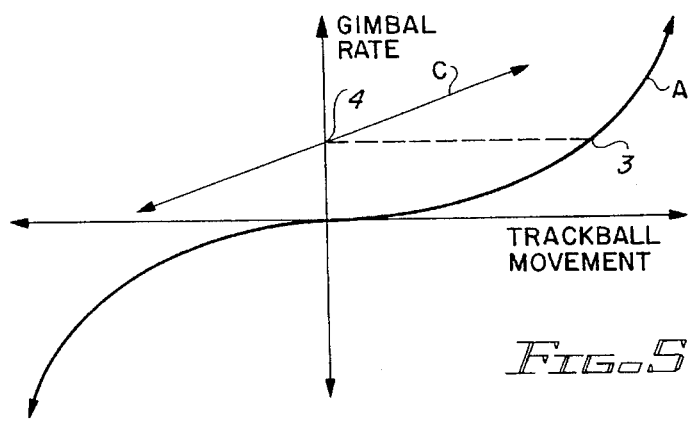
FIG. 5 is a graph showing plots of trackball movement in another mode of operation of the system of FIG. 1.

Selection of the Rate mode with the mode select switch 42 causes gimbal movement to be commanded in the direction of trackball movement, starting at zero plus default trim. The Rate mode may be entered from any of the other three modes—Position, Drift Trim or Vertical—controlled by the mode select switch 42. When in the Rate mode, movement of the trackball results in an increase of gimbal movement rate at a non-constant, increasingly non-linear rate of gimbal movement as defined by a control curve which may be selected from the menu which is visible on the video monitor. In the Rate mode, the rate of increased movement is proportional to the gimbal sensor field of view. Sample curves are shown in FIGS. 4 and 5. Rate curve A in each figure shows the non-linear relationship of rate of gimbal movement relative to trackball movement, beginning at the origin of the graph.

When the operator has matched the required rate of gimbal movement in relation to the object of interest, minor adjustments may be made by using the mode select switch 42 to re-select Rate mode. This resets the trackball position to zero while maintaining the attained rate of gimbal movement (translating along the dotted line 1-2 of FIG. 4) and allows fine tuning of the gimbal rate at a lower rate of increase or decrease, as exemplified by the new rate curve B in FIG. 4.

Entering the Rate mode from Drift Trim mode is similar to re-selecting Rate mode while in the Rate mode. It returns the rate of increased or decreased movement to the midpoint of the non-linear rate curve to allow fine adjustment to Drift Trim.

When the Drift Trim mode is selected by the mode select switch 42, it commands gimbal movement in the direction of trackball movement, starting at a preset "zero" rate which is set through the menu. Drift Trim mode is a Rate mode. The rate of increased or decreased movement is constant, linear and proportional to the sensor field of view. If Drift Trim is selected while in the Rate mode (represented in FIG. 5), initial output is equal to the existing Rate mode movement and is increased or decreased proportionately according to trackball movement. This is illustrated by the straight line C in FIG. 5. Transfer from Rate mode to Drift Trim mode occurs along the dotted line 3-4.

The Stop mode which is selectable by the mode select switch 42 permits the operator to escape from a set of gimbal motion commands that may not be desired. When the Stop mode is selected, gimbal movement is stopped and the gimbal remains in the last position selected with only Drift Trim applied. This allows the operator to reorient himself and then reorient the gimbal as desired. If the control is in the Position mode when Stop mode is selected, the gimbal goes to "boresight". When Stop mode is selected from either the Rate mode or the Vertical mode (selectable by the Vertical Mode switch 46), the gimbal goes to a zero rate of movement (plus Drift Trim) and, though it may be in Rate mode, appears fixed as in Position mode.

The zoom switch 48 is a two-way, center off, momentary contact rocker switch having positions marked T (telephoto) and W (wide angle). The function of the switch in a particular system configuration is dependent upon the sensor payload which is selected.

If DLTV is selected, the switch allows the operator to change the camera lens setting toward either telephoto or wide angle. As long as this switch is held in the direction of movement desired, the camera lens will continue to zoom in that direction until it reaches its limit of range. When the switch 48 is released, lens movement stops at the degree of telephoto or wide angle it has reached at that time.

If FLIR is the selected video payload, the switch 48 allows the operator to toggle between the various fields of view defined by the FLIR. If pressed toward T, it selects the telephoto (narrow) field of view while if pressed toward W, it selects the wide field of view.

The Iris Mode/B-W switch 50 is a momentary push button switch, the function of which is dependent on the sensor payload that is selected. If DLTV is selected, the switch toggles the iris setting between automatic and manual. If FLIR is selected, the switch toggles the FLIR sensor between "black hot" and "white hot."

The focus switch 52 is a two-position, center off, momentary rocker switch that focuses the FLIR or DLTV video camera. As long as the switch is pressed in the up or down direction, it will continue to change camera focus until the switch is released or it reaches the lens focus limit. When pressed in an up direction, the lens focuses near. When pressed in a down direction, the lens focuses far.

The gain switch 54 is a two-position, center off, momentary rocker switch that operates only when the FLIR sensor is selected. When pressed to the right, FLIR gain is increased. When pressed to the left, FLIR gain is decreased.. The increase or decrease of gain continues as long as the switch is pressed or until gain limits are reached. When the switch is released, the gain setting stops changing. Gain is defined as the contrast of heat intensity between objects.

The pedestal/iris switch 56 is a two-position, center off, momentary contact rocker switch, the function of which is dependent on the sensor payload that is selected. If DLTV is selected and if Manual has been selected by using the iris mode switch 50, pressing switch 56 in an up direction serves to close the camera iris. The iris continues to close as long as the switch 56 is pressed or until the iris close limit is reached. When the switch is pressed in a down direction, the iris continues to open as long as the switch 56 is pressed or until the iris open limit is reached. When the switch 56 is released, the iris stops opening or closing and remains in that setting.

If FLIR is selected, the operator is able to modify the pedestal value. When the switch 56 is pressed in an up position, the FLIR pedestal value continues to increase until the limit is reached or the switch is released. When the switch 56 is pressed in a down direction, the FLIR pedestal value continues to decrease until the limit is reached or the switch is released. Upon release of the switch 56, the FLIR pedestal value is set and remains at that setting. Pedestal value is defined as a temperature threshold below which objects of lower heat value are invisible to sensor.

The range switch 58 is only used in connection with a laser range finder.

The system power on switch 60 is a momentary push button switch which, when pressed, turns on system power. When the system powers up, a "reading" window appears on the monitor 16 (FIG. 1). The select switch 70 is then pressed to continue operation. Pressing the system power off switch 62 cuts power to the system.

The VTR switch 64 is a momentary push button switch to control an optional video tape recorder (VTR). Assuming the VTR is pre-configured in the record/pause state, pressing the switch 64 toggles the recorder between record and pause, allowing the selected video payload image to be recorded.

The auxiliary switch 66 is a momentary push button switch that can be used for functions which may be added to the system.

The menu switch 68 is a four-way, center off, momentary contact rocker switch. The four positions of the switch correspond to the four arrow keys of a computer keyboard, controlling movement within a menu screen, once the menu is active. When this switch is initially moved in any direction, the menu :selection mode is activated. If the main menu is not already displayed, the selection options appear across the top of the monitor, if selected in a previous set-up. This is in the form of a command line or a "button bar" having the following segments: exit menu, gimbal, payload, annotation-control, configuration, system and help. Movements of the menu switch 68 in the up, down, right and left directions enable the operator to move within the menu and submenus to highlight and then select specific menu items, using the select switch 70.

The menu select switch 70 is a momentary push button. This switch also activates the menu. When a menu item is highlighted, it can be selected by pressing the menu select button 70. When an item is selected, its submenu is displayed on the monitor.

The select switch or button 70 has the function of an ENTER key on a computer keyboard and its signals convert to ENTER signals in the keyboard interface block 18 (FIG. 2).

For example, when the payload segment of the menu is activated, a submenu appears providing a choice between FLIR and Daylight TV. Operating the menu switch 68 to develop up or down commands will highlight a selected item within the payload submenu, after which pressing the select button 70 selects a submenu for the designated payload. If FLIR is selected, an Infrared TV Control dialog box appears on the monitor 16 which displays field of view, focus control, image polarity, pedestal, power, cryo power and status. Adjustments can be made to the FLIR sensor using menu switch 68 and the menu select switch 70 when in the Infrared TV Control dialog box. Selected parameter values can be saved by highlighting Same as Defaults or Done and pressing the select button 70.

If the Daylight TV option is selected in the payload submenu, a corresponding dialog box appears which displays control selections for zoom., focus and iris. Making the appropriate selection by using the menu switch 68 and the menu select switch 70 permits control of the Daylight TV sensor in this control mode with the same option of saving selections as defaults.

Annotation is information that can be displayed on the video monitor, either temporarily or continuously, while viewing sensor imaging. Such information includes gimbal position in azimuth and elevation, gimbal power voltages, built-in test data, date and time, gimbal mode, serial communication status, television sensor status and infrared sensor status. The annotation-control segment of the menu enables the operator to choose various colors for the display, such as foreground colors, background colors and the color of each different annotation component. Similarly, selection of the configuration segment on the main menu produces a submenu which enables the user to make color selection in the manner already described. The remaining components of the command menu are not related to the gimbal control of the system of the invention and therefore need not be further discussed.

The trackball 40 and associated circuitry in the control panel 14 serve two significantly different functions in controlling the operation of the gimbal control system 10. In the first function, the trackball 40 operates, along with the select switch 70, in highlighting and selecting various items on the menu which, when activated, are displayed on the video monitor 16. In this mode, the trackball is essentially a replacement for a conventional computer mouse, as is customary for trackballs used with computers. Use of the trackball in combination with the mode select switch of the present invention, however, is not conventional and this feature presents patentable novelty.

Figure 6:
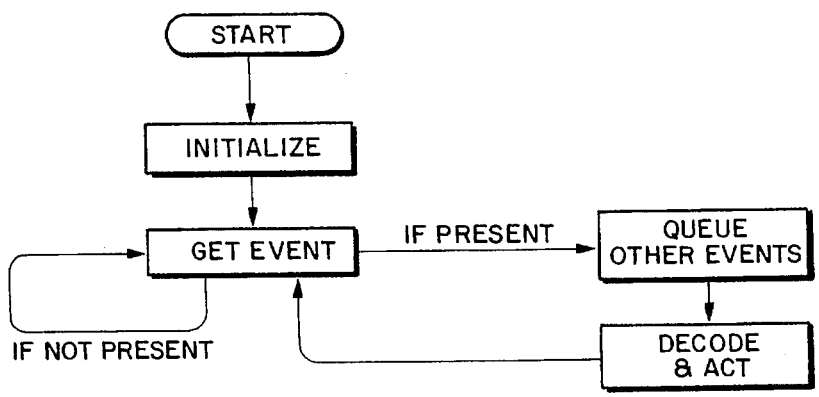
FIG. 6 is a functional flow diagram representing operation of the system of the invention.

A simplified functional flow diagram illustrating the basic operation of the system appears in FIG. 6. This illustrates the way in which the software program for the CPU 13 controls the system. The hand controller software for the ICU 20 resides on the CPU 13 and is the main executable program. This software contains all the required functionality to operate the ICU 20 and interface with the control panel 14, the gimbal unit 24 and the video display 16. The CPU 13 within the interface control unit 20 (FIG. 2) monitors incoming signals from the hand controller 14 via the keyboard interface 18 and the RS 232 interface link 32A. The software maintains bi-directional communication with the gimbal unit 24 via the gimbal servo controller 25 and the digital data link 22.

The software on the CPU 13 operates in what is referred to as an "event" mode. As indicated in the flow chart diagram of FIG. 6, starting the system moves to initialization where various system start-up parameters, annotation configuration, gimbal configuration and the like are defined. During initialization, appropriate code to the serial communications board 33 (FIG. 2) is downloaded and the board is initialized. Initialization enables the interrupt handling system for the keyboard interface block 18 and the trackball interface link 32A. Finally, it also initializes the video boards 36, 37 and the multiplex switching in the CPU 13.

Following initialization, the system moves to the "get event" state which updates any annotation obtained from the interface with the serial communications board 233 on the state of the gimbal unit 24 and the payload sensors 26. The CPU 13 further monitors the system for various acceptable interrupts, such as defined keyboard and trackball signals in the interfaces coupled to the links 32A, 32B. If no event is present, the system remains in the "get event" state, also considered the Idle State. If an event is present, the system moves to Queue Other Events. This state handles valid interrupts and will queue other incoming events so that they may be appropriately handled after the required processing for a given event is complete.

The Decode and Act state performs the majority of the work in the operation of the system under control of the ICU 20. In this state, the desired interrupt is decoded and, based upon its state, as defined by the keys and trackball functionality, the desired function is performed. This requires monitoring the database which defines the current state of the system (i.e., for trackball functionality and various ones of the switches in the hand control unit 14). This state also uses data annotation to indicate when a particular switch is selected and may update annotation describing the change of status or functionality of the system.

Once the required functionality is performed, the system returns to the Get Event state where the system continues monitoring gimbal status, updating the annotation and waiting for the next interrupt.

There has thus been disclosed, in the context of a gimbal system incorporating a video display monitor and a computer following a software program to control the gimbal, a hand control unit comprising a plurality of switches and a trackball for driving the gimbal in various modes which are selectable by the switches. The conditions of the switches are supplied to the computer through a serial interface which interprets the switch conditions as keyboard key presses which are applied to the computer via a standard keyboard interface. Use of the trackball in controlling the gimbal movement in various modes which are selectable by the hand control unit facilitates and simplifies control of the gimbal by the operator in ways which are unachievable with previously used joystick controllers.

The shape of the hand controlled unit and the positioning of the switches and the trackball thereon are designed to reduce stress in the operator's hands and arms by allowing the hands and arms to lie on the controls in attitudes approximating a natural rest position. This advantageously results in reduced operator fatigue and stress on long missions due to cramping and other problems associated with holding the thumb or hand very still for an extended length of time. Furthermore, the provision of the separate hand-held controller helps in isolating the operator's hands from the vibration which is typical in flight operations. This allows for more precise gimbal control.

Although there have been shown and described hereinabove specific arrangements of a gimbal control system using a trackball in accordance with the invention for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the annexed claims.

What is claimed is:

1. A gimbal control system comprising:
   a gimbal unit having the capability of azimuthal and vertical rotation;
   a hand controller having a trackball for directing the rotation of the gimbal unit, the hand controller further including a plurality of switching means including a mode select switch for selecting one of a plurality of control modes defining predetermined control relationships between the trackball and the gimbal unit;
   a video display unit having means for displaying images corresponding to feedback from the gimbal unit which are indicative of gimbal orientation; and
   a computer having means for coupling the computer to the gimbal unit, the hand controller and the video display unit for enabling the trackball to control movement and orientation of the gimbal unit in one of said plurality of control modes selected by said mode select switch.

2. The system of claim 1 wherein the gimbal unit includes a sensor which is mounted to rotate with the gimbal unit and provide output signals to the computer for developing video display images corresponding to views sensed by the sensor.

3. The system of claim 2 wherein the means for coupling the computer to the hand controller mode includes interface means having a converter for converting the conditions of respective ones of said switching means to corresponding key press signals of a standard computer keyboard for application to the computer.

4. The system of claim 2 wherein said mode select switch is a four-way, center off, momentary contact rocker switch having four rocker positions corresponding to four selectable control modes.

5. A gimbal control system comprising:
   a gimbal unit having the capability of azimuthal and vertical rotation;

a hand controller having a trackball for directing the rotation of the gimbal unit, the hand controller further including a plurality of switching means including a mode select switch for selecting one of a plurality of control modes defining predetermined control relationship between the trackball and the gimbal unit;

a video display unit having means for displaying images corresponding to feedback from the gimbal unit which are indicative of gimbal orientation; and a computer having means for coupling the computer to the gimbal unit, the hand controller and the video display unit for enabling the trackball to control movement and orientation of the gimbal unit in one of said plurality of control modes selected by said mode select switch;

wherein the gimbal unit includes a sensor which is mounted to rotate With the gimbal unit and provide output signals to the computer for developing video display images corresponding to views sensed by the sensor;

wherein said mode select switch is a four-way, center off, momentary contact rocker switch having four rocker positions corresponding to four selectable control modes; and wherein the four selectable modes are Position, Rate, Drift Trim and Stop.

6. The system of claim 5 wherein selection of the Position mode directs the gimbal to a commanded one of a plurality of preselected positions determined by the computer, including a default position preset by the computer.

7. The system of claim 6 wherein the default position is boresight.

8. The system of claim 5 in wherein the gimbal, when being controlled in the Position mode, is directed to said commanded position relative to the aircraft independent of gyro stabilization.

9. The system of claim 6 wherein the control relationship of the gimbal to the trackball in the Position mode establishes a constant linear rate of increase of gimbal movement which is proportional to trackball movement.

10. The system of claim 9 wherein said rate of increase is selectable by the operator.

11. The system of claim 5 wherein movement of the mode select switch to select Rate mode results in gimbal movement at a rate which increases in a non-linear relationship relative to trackball movement.

12. The system of claim 11 wherein said non-linear relationship of controlled gimbal movement relative to trackball movement is selectable by the operator.

13. The system of claim 11 wherein the rate of gimbal movement, when operating in the Rate mode, is proportional to the gimbal sensor field of view.

14. The system of claim 12 wherein repeated selection of the Rate mode by the mode selector switch resets the trackball position to zero while maintaining the attained rate of gimbal movement.

15. The system of claim 5 wherein selection of the Drift Trim mode by the mode select switch results in gimbal movement proportional to the direction of trackball movement at a preselected "zero" rate which is preset by the operator.

16. The system of claim 15 wherein operation in the Drift Trim mode results in the rate of gimbal movement being constant, linear and proportional to the sensor field of view.

17. The system of claim 5 wherein selection of the Stop mode by the mode select switch removes control of the gimbal from the motion commands previously in effect.

18. The system of claim 17 wherein selection of the Stop mode causes gimbal movement to stop and remain in the last selected position with only Drift Trim applied.

19. The system of claim 17 wherein transfer of control from the Position mode to the Stop mode causes the gimbal to go to the boresight position.

20. The system of claim 1 wherein the hand controller is formed in an ergonomic design adapted to be held in the operator's right hand in a natural position with the left hand and arm intersecting the right hand and arm at approximately 90 degrees.

21. A gimbal control system comprising:

a gimbal unit having the capability of azimuthal and vertical rotation;

a hand controller having a trackball for directing the rotation of the gimbal unit, the hand controller further including a plurality of switching means including a mode select switch for selecting one of a plurality of control modes defining predetermined control relationships between the trackball and the gimbal unit;

a video display unit having means for displaying images corresponding to feedback from the gimbal unit which are indicative of gimbal orientation; and a computer having means for coupling the computer to the gimbal unit, the hand controller and the video display unit for enabling the trackball to control movement and orientation of the gimbal unit in one of said plurality of control modes selected by said mode select switch;

wherein the hand controller includes a generally triangular shaped housing having three triangle side portions and an upper face bounded thereby, the first and second ones of said side portions being joined by a gently rounded curved portion and the two triangle vertices adjacent the third one of said side portions being truncated to form two additional side portions.

22. The system of claim 21 wherein all intersections of the side portions of the hand controller housing are formed with gently rounded curved portions.

23. The system of claim 21 wherein the mode select switch is mounted on a first one of said truncated additional side portions for ready access by the forefinger of an operator's right hand.

24. The system of claim 23 further including a plurality of additional control switches positioned for ready access by the left hand of an operator holding the controller in the operator's right hand.

25. The system of claim 24 wherein the additional control switches are mounted, respectively, along the first and second sides of the controller housing and in a region on the upper face of the housing which is bounded by said first and second sides and a line extending generally parallel to said second side from the approximate mid point of said first side.

26. The system of claim 25 wherein the trackball is positioned on the upper face of the housing outside of said bounded region.

* * * * *